(12) United States Patent
De Vries et al.

(10) Patent No.: US 8,862,398 B2
(45) Date of Patent: Oct. 14, 2014

(54) TRACKING TARGET OBJECTS ORBITING EARTH USING SATELLITE-BASED TELESCOPES

(71) Applicant: Lawrence Livermore National Security, LLC, Livermore, CA (US)

(72) Inventors: Willem H. De Vries, Livermore, CA (US); Scot S. Olivier, Livermore, CA (US); Alexander J. Pertica, Livermore, CA (US)

(73) Assignee: Lawrence Livermore National Security LLC, Livermore, CA (US)

( * ) Notice: Subject to any disclaimer, the term of this patent is extended or adjusted under 35 U.S.C. 154(b) by 0 days.

(21) Appl. No.: 13/801,898

(22) Filed: Mar. 13, 2013

(65) Prior Publication Data

US 2014/0278082 A1 Sep. 18, 2014

(51) Int. Cl.
*G01S 13/88* (2006.01)
*G01S 19/00* (2010.01)
*B64G 3/00* (2006.01)

(52) U.S. Cl.
CPC ........................................ *B64G 3/00* (2013.01)
USPC ....................... 701/519; 342/357.2

(58) Field of Classification Search
USPC ....................... 701/519; 342/357.2
See application file for complete search history.

(56) References Cited

U.S. PATENT DOCUMENTS

| 5,583,514 | A * | 12/1996 | Fulop | 342/359 |
|---|---|---|---|---|
| 5,731,786 | A * | 3/1998 | Abraham et al. | 342/357.25 |
| 6,714,521 | B2 * | 3/2004 | Draim | 370/316 |
| 7,584,085 | B2 * | 9/2009 | Gold et al. | 703/8 |
| 7,741,994 | B2 * | 6/2010 | Pande et al. | 342/357.44 |
| 2007/0046532 | A1 * | 3/2007 | Bucknor et al. | 342/357.09 |
| 2007/0178833 | A1 * | 8/2007 | Wahlberg et al. | 455/12.1 |
| 2008/0299990 | A1 * | 12/2008 | Knoblach et al. | 455/456.1 |
| 2010/0198512 | A1 * | 8/2010 | Zhang et al. | 701/226 |
| 2013/0124079 | A1 * | 5/2013 | Olivier et al. | 701/301 |
| 2013/0275036 | A1 * | 10/2013 | Olivier et al. | 701/301 |

* cited by examiner

*Primary Examiner* — Thomas G Black
*Assistant Examiner* — Tyler Paige
(74) *Attorney, Agent, or Firm* — Perkins Coie LLP (57) ABSTRACT

A system for tracking objects that are in earth orbit via a constellation or network of satellites having imaging devices is provided. An object tracking system includes a ground controller and, for each satellite in the constellation, an onboard controller. The ground controller receives ephemeris information for a target object and directs that ephemeris information be transmitted to the satellites. Each onboard controller receives ephemeris information for a target object, collects images of the target object based on the expected location of the target object at an expected time, identifies actual locations of the target object from the collected images, and identifies a next expected location at a next expected time based on the identified actual locations of the target object. The onboard controller processes the collected image to identify the actual location of the target object and transmits the actual location information to the ground controller.

20 Claims, 6 Drawing Sheets

TRACKING TARGET OBJECTS ORBITING EARTH USING SATELLITE-BASED TELESCOPES

STATEMENT REGARDING FEDERALLY SPONSORED RESEARCH

The United States Government has rights in this invention pursuant to Contract No. DE-AC52-07NA27344 between the U.S. Department of Energy and Lawrence Livermore National Security, LLC, for the operation of Lawrence Livermore National Laboratory.

CROSS-REFERENCE TO RELATED APPLICATION(S)

This application is related to U.S. patent application Ser. No. 13/559,440, filed on Jul. 26, 2012, entitled "MONITORING OBJECTS ORBITING EARTH USING SATELLITE-BASED TELESCOPES," which claims the benefit of U.S. Patent Application No. 61/511,940, filed on Jul. 26, 2011, entitled "SPACE-BASED TELESCOPES FOR ACTIONABLE REFINEMENT OF EMPHEMERIS (STARE)," each of which is incorporated herein by reference in its entirety.

BACKGROUND

Thousands of satellites have been launched into earth orbit, with nearly 1,000 of them still active in providing valuable services such as military and intelligence data collection, global positioning, telecommunications, weather and climate monitoring, and so on. It can be important to know the actual location of a satellite at all times during its operational life from its launch until it either reenters the atmosphere or, in the case of a satellite in geostationary earth orbit ("GEO"), enters a graveyard orbit. When a satellite is launched, the satellite may initially enter low earth orbit ("LEO"). If low earth orbit is not its final orbit, the satellite will eventually fire its rockets to maneuver into its final orbit, which may be middle earth orbit ("MEO") or geostationary earth orbit. Knowledge of the actual location can be used to help ensure that the satellite is moving to the correct orbit, stays in the correct orbit, has maneuvered correctly, and is working properly in general. For example, a satellite that may have been in the correct orbit and working properly for several years may stop communicating. Knowledge of the actual location would be useful in determining whether the satellite has stopped working but is in the correct orbit. If the actual location indicates that the satellite is in the correct orbit, then efforts can be undertaken to restore the satellite to proper working order. If, however, the actual location cannot be determined, then the satellite may have experienced a catastrophic event (e.g., collision with space junk) resulting in the breaking of the satellite into several large pieces (i.e., space junk), each of which poses of risk of colliding with other satellites.

Although a satellite that is working properly can send its actual location to ground control, once a satellite stops working properly, it may not be able to send its actual location. In such a case, an external tracking system is needed to track the actual location of the satellite or its pieces in the case of a catastrophic event. Such a satellite or its pieces are referred to as "target objects." Although ground-based telescopes can be used to track some target objects, ground-based telescopes may not be particularly effective because of gaps in tracking coverage, high cost, poor atmospheric conditions (e.g., cloud cover), and so on. It would be desirable to have an external tracking system that could provide effectively track target objects at a reasonable cost.

DETAILED DESCRIPTION

A system for tracking objects that are in earth orbit via a constellation or network of satellites having imaging devices is provided. In some embodiments, an object tracking system includes a ground controller and, for each satellite in the constellation, an onboard controller. The ground controller receives ephemeris information for a target object and directs that at least some of the ephemeris information be transmitted to the satellites. The ground controller may include a computing device connected to a communication mechanism (e.g., satellite dish) for transmitting data to and receiving data from the satellites. For example, prior to the launch of a target object, the ground controller may be provided with ephemeris information indicating the expected location of the target object at an expected time so the object tracking system can start tracking the target object. The ground controller transmits the ephemeris information to at least some of the satellites.

Each onboard controller receives ephemeris information for a target object, collects images of the target object based on the expected location of the target object at an expected time, identifies actual locations of the target object from the collected images, and identifies a next expected location at a next expected time based on the identified actual locations of the target object. To collect an image, the onboard controller orients the imaging device towards the expected location and makes an observation or collects an image at the expected time. The onboard controller processes the collected image to identify the actual location of the target object and transmits the actual location information to the ground controller.

Because the object tracking system is satellite-based, it can provide comprehensive coverage that minimizes gaps in coverage. For example, coverage gaps may result from the target object not being illuminated by the sun, the target object being too dim due to its distance from the satellite, or the target object being too close to the sun or moon to observe. When a satellite suspends its tracking of a target object due to a coverage gap, the satellite can resume tracking the target object after a coverage gap. Even if a target object is not in the expected location after the satellite resumes tracking, the target object may be in the collected image, assuming the image device has a large enough field of view. In certain cases, the target object may not be in the collected image after tracking is resumed. For example, the target object may have fired rockets as part of maneuvering from low earth orbit to middle earth orbit and thus not be at the expected location. In such a case, the onboard controller may enter a search mode and collect images surrounding the expected location to try to reacquire the target object.

In some embodiments, the onboard controller may transition from a standard mode of collecting images to a prioritized mode of collecting images of a target object when the actual location of the target object is sufficiently different from the expected location to indicate an unexpected change in location. In the standard mode of collecting images, an onboard controller may collect an image of the target object at a frequency of, for example, once every 15 minutes. If the target object unexpectedly fires a rocket just after an image is collected, the target object would not be at the expected location when the next image is collected. In such a case, the onboard controller may enter a prioritized mode in which images of that target object are collected much more frequently, such as, for example, once every two minutes. The onboard controller may stay in the prioritized mode until it determines that the orbit of the target object has stabilized such that changes in location are as expected. If a satellite is tracking multiple target objects, the onboard controller may enter a low-priority mode for other target objects and collect images of those other target objects at a lower frequency, such as, for example, once every 20 minutes. By entering the low-priority mode for the other targets, the onboard controller can help ensure that it has time to track the target object that is in prioritized mode. If the onboard controller does not enter low-priority mode for the other target objects, the onboard controller may not have sufficient time to orient the imaging device to the other target objects and re-orient the imaging device on the target object in prioritized mode so that the target object is in the next collected image.

The satellites of the object tracking system may be three-unit cube satellites ("CubeSats"). A CubeSat is a nanosatellite (e.g., 1 to 10 kilograms) that measures 10 centimeters on a side. The satellites include three CubeSat units attached end-to-end to form a 30×10×10 cm nanosatellite. In some embodiments, the satellites may be the 3U CubeSats developed as part of the Colony project of the U.S. National Reconnaissance Office. Each satellite includes an imaging device, an attitude control system, a power system, a global navigation satellite system ("GNSS") receiver, and an onboard controller. The satellites may be arranged into orbital groups with each satellite of an orbital group sharing the same orbital plane. The satellites may be positioned either in low earth orbit or middle earth orbit. In low earth orbit, a LEO constellation of 18 satellites may be arranged into three orbital groups of six satellites each. The satellites may have an inclination of 98 degrees with a mean altitude of 700 km resulting in a sun-synchronous orbit. In middle earth orbit, a MEO constellation of 12 satellites may be arranged into six orbital groups of two satellites each. In some embodiments, the imaging device may have a 92 mm F/2 telescope that points out along the axis of the satellite. The imaging device may include an optical CCD/CMOS detector with at least 1024× 1024 pixels. The pixel size may be 10 to 25μ which may be re-imaged onto the sky to angular sizes of 10 to 20 arcseconds. In such a case, the field of view would be between 2.8×2.8 degrees and 5.7×5.7 degrees.

In some embodiments, when a target object is no longer in a collected image as expected, the onboard controller may enter a search mode attempting to reacquire the target object. For example, upon detecting that the target object is "lost," the onboard controller may enter a spiral search mode or a square search mode. In a spiral search mode, the onboard controller may collect images in a spiral pattern out from the last expected location until the target object is reacquired or a search termination criterion is satisfied. In the square search mode, the onboard controller ensures that each point in space is imaged twice. The onboard controller initially collects four images at a first level centered on the four corners of the first collected image that did not include the target object. By centering on the four corners, the combination of the four collected images will fully overlap the first collected image because each of the four collected images overlaps one-fourth of the first collected image. The onboard controller may continue at a second level so that the combination of the next eight collected images overlaps the portions of the four collected images that did not overlap the first collected image, resulting in a second imaging of those portions. The onboard controller may continue to collect eight images at the third level, 12 images at the fourth level, and so on until the target object is reacquired or a search termination criterion is satisfied.

In some embodiments, the object tracking system may have multiple satellites tracking the same target object. In such a case, when a satellite detects a variation from an expected location of the target object, the satellite may relay that information to the other satellites so they can adjust their tracking of the target object. If the satellites can communicate only with the ground controller, then a satellite would need to wait until it is in communication range of a satellite dish to transmit to the ground controller. Similarly, the ground controller would need to wait until the other satellites are within communication range of a satellite dish to complete the relay of the information. Alternatively, the object tracking system may employ one or two relay GEO satellites in geostationary orbit. When a satellite detects a variation from an expected location, the satellite relays that information to a GEO satellite. The GEO satellite can then relay that information to the satellites that are within its communication range and to the other GEO satellite, if any. That GEO satellite can then relay that information to the satellites that are within its communication range.

Figure 1:
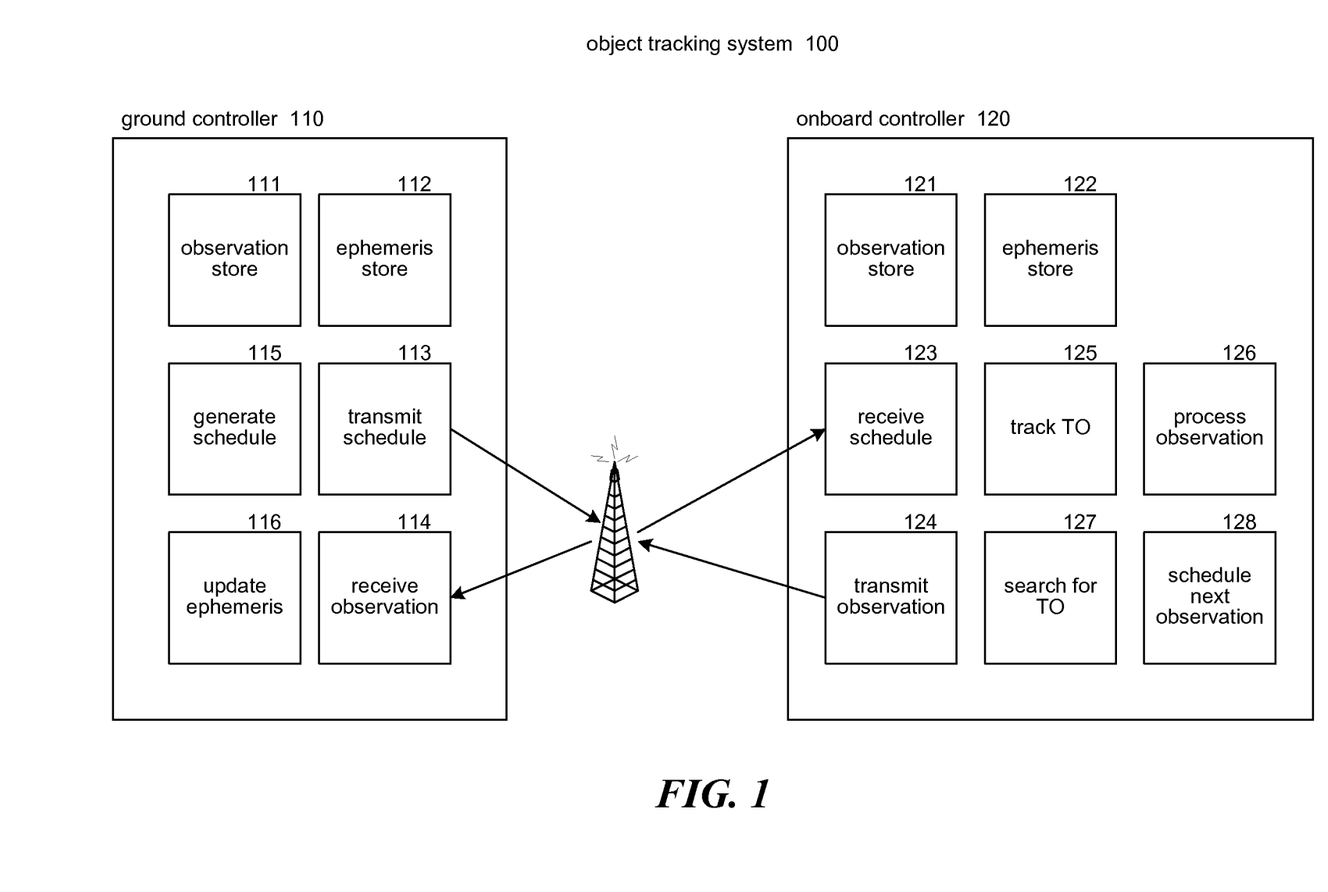
FIG. 1 is a flow diagram that illustrates components of the object tracking system in some embodiments.

FIG. 1 is a flow diagram that illustrates components of the object tracking system in some embodiments. The object tracking system 100 includes a ground controller 110 and an onboard controller 120 that communicate via a communication mechanism 130. The ground controller includes an observation store 111, an ephemeris store 112, a transmit schedule component 113, a receive observation component 114, a generate schedule component 115, and an update ephemeris component 116. The observation store stores information relating to the target objects that has been collected from the onboard controllers. The ephemeris store includes information describing expected locations of target objects at expected times. The generate schedule component generate schedules for the satellites to track target objects based on the ephemeris information of the ephemeris store. The generate schedule component may generate an initial schedule based on the initial ephemeris information and generate updated schedules based on updated ephemeris information. The update ephemeris component updates the ephemeris information of the ephemeris store based on new observations of the observation store. The transmit schedule component transmits schedule information to the communications mechanism for transmission to the satellites. The receive observation component receives observations transmitted from the satellites to the communication mechanism and updates the observation store.

The onboard controller includes an observation store 121, an ephemeris store 122, a receive schedule component 123, a transmit observation component 124, a track target object component 125, a process observation component 126, a search for target object component 127, and a schedule next observation component 128. The observation store stores observation information collected by the onboard controller. The ephemeris store stores ephemeris information either received from the ground controller or generated by the onboard controller from new observations. The receive schedule component receives schedule information indicating at least an initial location and observation time of a target object from the communication mechanism as relayed from the ground controller. The transmit observation component transmits the observation information to the communication mechanism for relay to the ground controller. The track target object component controls the collecting of images at the appropriate observation time, the processing of the observations, and the scheduling of the next observation. The process observation component processes the collected image to identify the actual location of the target object and enter the standard, prioritized, low-priority, or search mode as appropriate. The search for target object component controls the collecting of images to locate a lost object. The schedule next observation component determines the next observation time for a target object based on the current mode.

The computer system on which the ground controller may be implemented may be a multi-processor computer system with nodes, may include a central processing unit and memory, and may include input devices (e.g., keyboard and pointing devices), output devices (e.g., display devices), and storage devices (e.g., disk drives). Each node may include multiple processors and/or cores. The computer system on which the onboard controller is implemented may be a low-power processor such as an ARM processor. Computer-readable media include computer-readable storage media and data transmission media. The computer-readable storage media are tangible media that include memory and other storage devices that may have recorded upon or may be encoded with computer-executable instructions or logic that implement the ground controller. The data transmission media are media for transmitting data using signals or carrier waves (e.g., electromagnetism) via a wire or wireless connection.

The object tracking system may be described in the general context of computer-executable instructions, such as program modules, executed by one or more computers or other devices. Generally, program modules include routines, programs, objects, components, data structures, and so on that perform particular tasks or implement particular abstract data types. Typically, the functionality of the program modules may be combined or distributed as desired in various embodiments. For example, the overall functionality of the track object component may be performed by the ground controller with the onboard controller responsible for orienting the imaging device as detected, collecting an image, and transmitting the image to the ground controller. Alternatively, the onboard controller could identify the actual location of the target object within a collected image and transmit to the ground controller the actual location so that the ground controller can determine the next expected location and next observation time.

Figure 2:
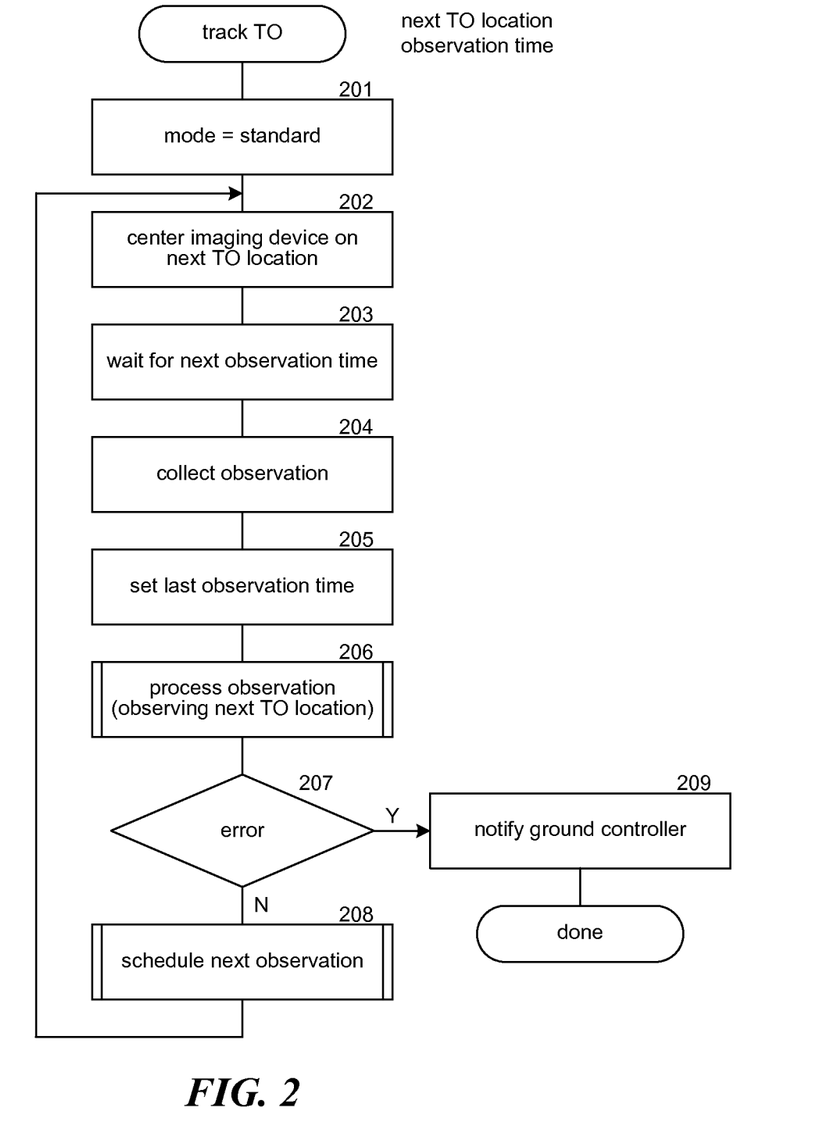
FIG. 2 is a flow diagram that illustrates the processing of the track target object component of the object tracking system in some embodiments.

FIG. 2 is a flow diagram that illustrates the processing of the track target object component of the object tracking system in some embodiments. The component is provided with a next expected location (i.e., next target object location) and an observation time and starts tracking the target object at that observation time. In block 201, the component sets the mode to standard mode. In blocks 202-208, the component loops collecting images of the target object at various next expected locations. In block 202, the component orients the imaging device at the next expected location so that the imaging device is centered on the next expected location. In block 203, the component waits for the next observation time. In block 204, the component collects an image as an observation at the next observation time. In block 205, the component sets the last observation time to record the time of the last observation. In block 206, the component invokes the process observation component passing an indication of the collected observation and the next expected location. In decision block 207, if an error is reported by the process observation component, then the component reports an error to the ground controller in block 209 and completes, else the component continues at block 208. In block 208, the component invokes the schedule next observation component and then loops to block 202 to collect the next observation.

Figure 3:
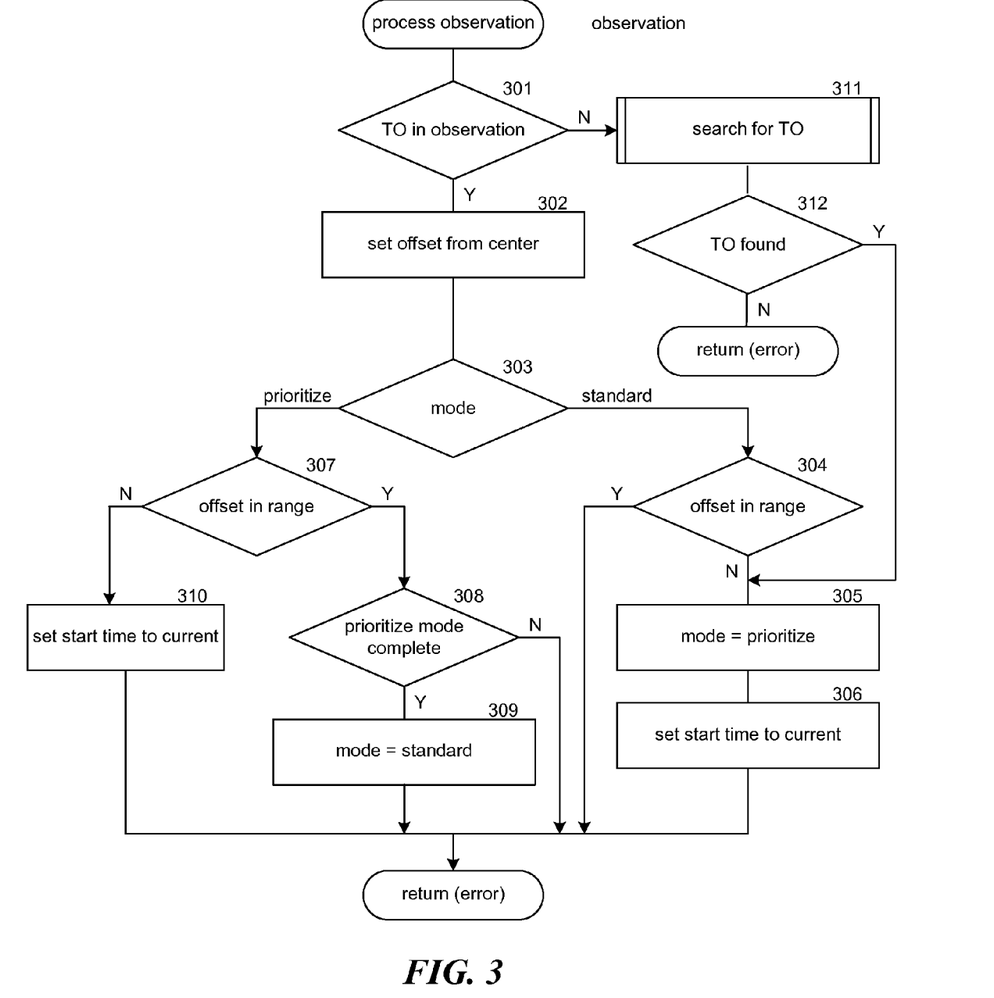
FIG. 3 is a block diagram that illustrates the processing of the process observation component of the object tracking system in some embodiments.

FIG. 3 is a block diagram that illustrates the processing of the process observation component of the object tracking system in some embodiments. The component is passed an indication of an observation and identifies whether to stay in the current mode depending on whether the target object is at the next expected location. In decision block 301, if the target object is in the collected image, then the component continues at block 302, else the component continues at block 311. In block 302, the component calculates the offset of the target object from the center of the collected image. In decision block 303, if the current mode is standard, then the component continues at block 304, else the component continues at block 307. In decision block 304, if the offset is within the standard range, then the object is accurately acquired and the component stays in standard mode for that target object and returns, else the component continues at block 305. In block 305, the component sets the mode to prioritized. In block 306, the component sets the start time of the prioritized mode to the current time to track how long the onboard controller has been in the prioritized mode for that target object. The component then returns. In decision block 307, if the offset is within the standard range, then the component continues at block 308, else the component continues at block 310. In decision block 308, if the prioritized mode is complete (e.g., the start time to the current time satisfies a complete threshold), then the component continues at block 309, else the component is still in the process of correctly acquiring the target object and thus stays in prioritized mode and then returns. In block 309, the component has correctly acquired the target object and thus switches to standard mode and then returns. In block 310, since the offset is not in the standard range, the component restarts the prioritized mode by setting the start time to the current time and then returns. In block 311, the component invokes the search for target object component to enter the search mode. In decision block 312, if the target object was reacquired, then the component enters into prioritized mode to see if the required object has been correctly acquired by continuing at block 305, else the component returns an error.

Figure 4:
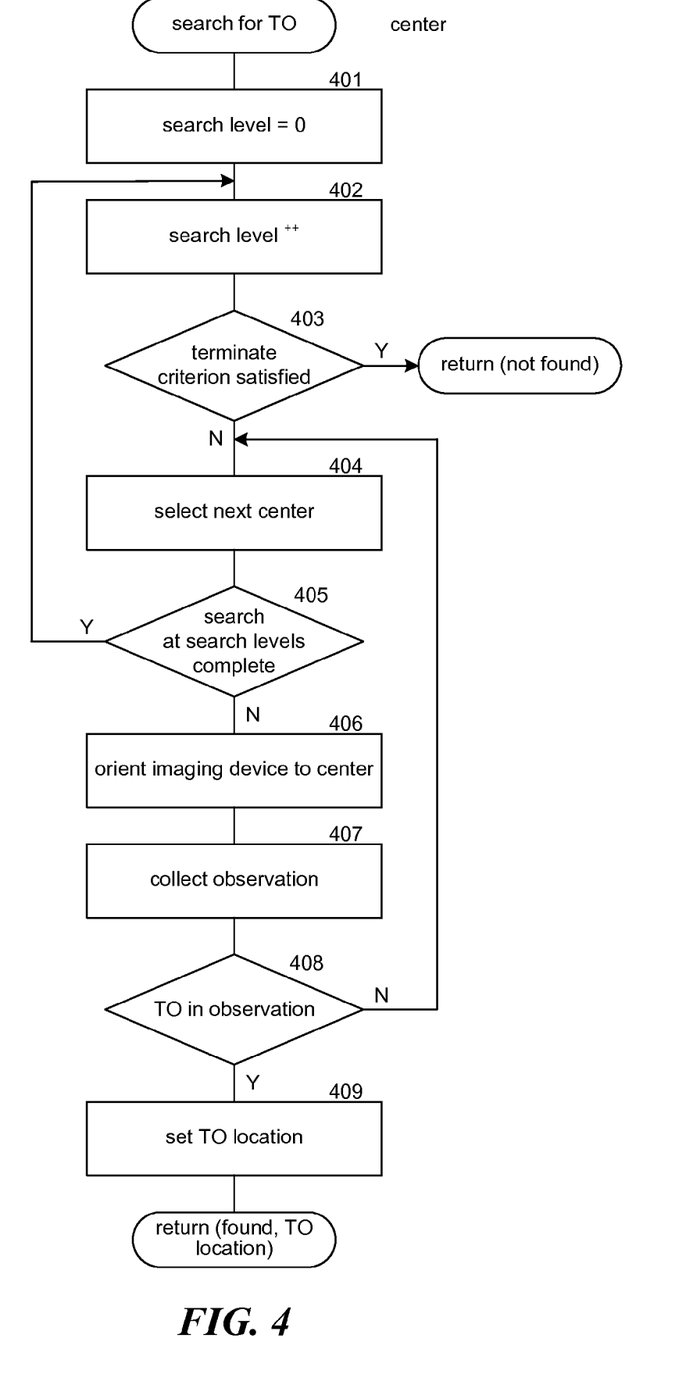
FIG. 4 is a flow diagram that illustrates the processing of the search for target object component of the object tracking system in some embodiments.

FIG. 4 is a flow diagram that illustrates the processing of the search for target object component of the object tracking system in some embodiments. The component is passed an indication of the last expected location of the target object, which corresponds to the center of the collected image, and attempts to reacquire the target object. In block 401, the component initializes the search level. In block 402, the component increments the search level to the next level. In decision block 403, if a termination criterion is satisfied, then the component returns an indication that the target object could not be reacquired, else the component continues at block 404. In block 404, the component selects the next center for the next image to be collected at the current search level. In decision block 405, if the search at the current search level is complete, then the object has not yet been reacquired and the component loops to block 402 to start searching at the next level, else the component continues at block 406. In block 406, the component orients the imaging device at the selected center. In block 407, the component collects an observation. In decision block 408, if the target object is in the collected image, then the component continues at block 409, else the component loops to block 404 to select the next center. In block 409, the component sets the location of the target object and returns the target object location and an indication that the target object has been reacquired.

Figure 5:
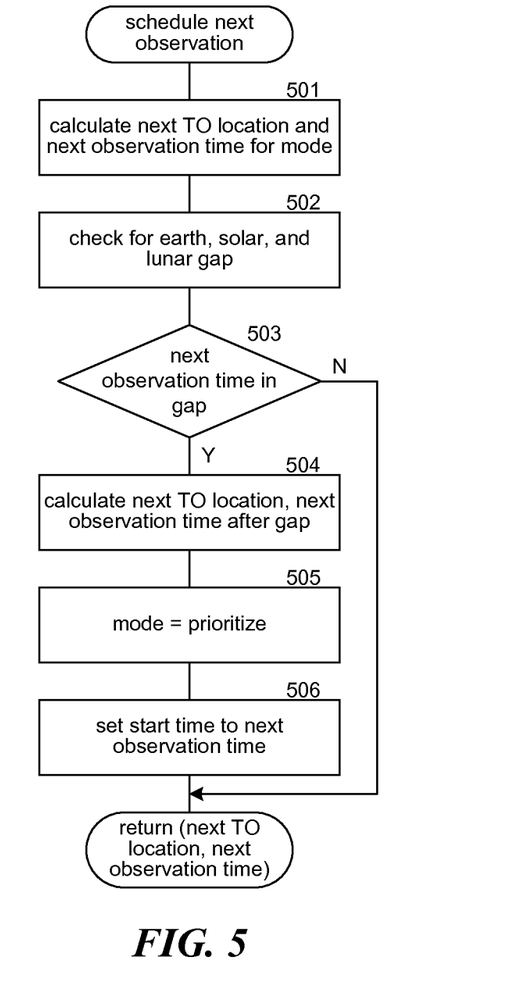
FIG. 5 is a flow diagram that illustrates the processing of the schedule next observation component of the object tracking system in some embodiments.

FIG. 5 is a flow diagram that illustrates the processing of the schedule next observation component of the object tracking system in some embodiments. The component sets the next expected location and next observation time for the target object. In block 501, the component calculates the next expected location and observation time factoring in the current mode. In block 502, the component checks to determine whether the next expected location at the next observation time is within a coverage gap. In decision block 503, if the target object will be within the coverage gap, then the component continues at block 504 to suspend tracking of the target object until it leaves the coverage gap, else the component returns an indication of the next expected location and observation time. In block 504, the component calculates the next expected location and observation time after the target object emerges from the coverage gap. In block 505, the component sets the mode to prioritized so that the target object can be tracked more accurately as it emerges from the coverage gap. In block 506, the component sets the start time of the prioritized mode to the next observation time and then returns an indication of the next expected location and observation time.

Figure 6:
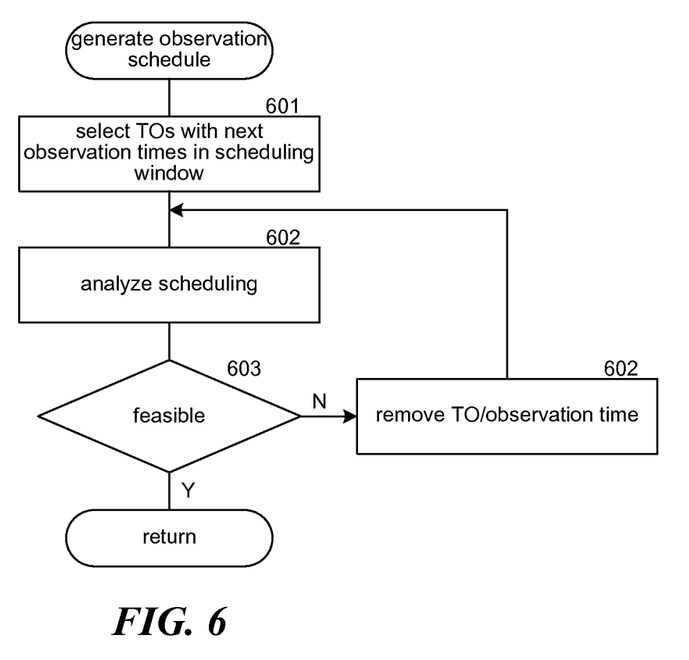
FIG. 6 is a flow diagram that illustrates the processing of the generate observation schedule component of the object tracking system in some embodiments.

FIG. 6 is a flow diagram that illustrates the processing of the generate observation schedule component of the object tracking system in some embodiments. When multiple target objects are being tracked by the object tracking system, the schedule for collecting images of one target object may conflict with the schedule for collecting images of another target object. For example, a satellite that is scheduled to collect an image of one target object at a certain next expected location and observation time may not have time to reorient the imaging device to collect an image of another target object at its next expected location and observation time. The observation schedules may be generated by the ground controller and/or the onboard controllers. Any of a variety of well-known scheduling algorithms may be used to identify a feasible schedule, which is a schedule without conflicts. For example, if the time to orient the imaging device is considered to be the time needed to deliver and the observation time can be considered as a deliver-by time, the algorithm for scheduling the delivery of data can be used. More sophisticated scheduling algorithms may be used to attempt to vary the observation times (and identify corresponding next expected times) with an observation window. In block 601, the component selects the target objects with observation times within a scheduling window. In block 602, the component determines whether the schedule of observation times of the selected objects is feasible. In decision block 603, if the schedule is feasible, then the component returns with the observation times of the selected objects, else the component continues at block 604. In block 604, the component selects an observation time of a target object to remove from the scheduling window. For example, the component may remove an observation time of a target object that is currently in the low priority mode. Alternatively, the component may separate the observation times of target objects whose observation times are too close to be feasible. The component then loops to block 602 to determine whether the schedule as adjusted is feasible.

From the foregoing, it will be appreciated that specific embodiments of the invention have been described herein for purposes of illustration but that various modifications may be made without deviating from the scope of the invention. For example, even though the ground controller is described as being ground-based and the onboard controller is described as being on board, the functions performed by the controller can be distributed among ground-based, space-based, onboard, and/or off-board controllers. For example, depending on the processing power of the satellites, the onboard controller may generate its own schedules for making observations. Also, depending on the bandwidth of the communications links, the raw collected images could be downloaded to an off-board controller for further processing. In such a case, the off-board controller (e.g., the ground controller), rather than the onboard controller, would perform the processing of the process image component. The object tracking system may identify the target object in a collected image by comparing the objects of the image to the celestial objects that are expected to be in the image. The location of the celestial objects can be identified from a database of celestial objects. Alternatively, an onboard controller may collect multiple images near the observation time and identify the target object based on its movement between the collected images. Accordingly, the invention is not limited except as by the appended claims.

We claim:

1. A system for tracking target objects that are in earth orbit via a network of satellites having imaging devices for collecting images, the system comprising:
 a ground controller for receiving ephemeris information for target objects and directing at least some of the ephemeris information to be transmitted to the satellites; and
 an onboard controller of each satellite for receiving ephemeris information for a target object, identifying an observation time and an expected location of the target object at that observation time, orienting an imaging device towards the expected location, collecting an image at the observation time, analyzing the collected image to determine whether the target object is at the expected location, and upon determining that the target object is not at the expected location, identifying an actual location of the target object.

2. The system of claim 1 wherein the satellites are in middle earth orbit.

3. The system of claim 1 wherein the satellites are in low earth orbit.

4. The system of claim 1 wherein when the analyzing indicates that the target object is not within the collected image, the onboard controller identifies the actual location of the target object by entering a search mode that reorients the imaging device toward locations different from the expected location, collects images at the different locations, and analyzes the collected images to determine the actual location of the target object.

5. The system of claim 4 wherein the search mode is based on a spiral pattern of collecting images.

6. The system of claim 4 wherein the search mode is based on a square pattern of collecting images.

7. The system of claim 1 wherein the onboard controller, after identifying the actual location of the target object, determines a next observation time and a next expected location of the target object at that next observation time, orients the imaging device towards the next expected location, collects a next image at the next observation time, analyzes the next collected image to determine whether the target object is at the next expected location, and upon determining that the target object is not at the next expected location, identifies a next actual location of the target object.

8. The system of claim 7 wherein the onboard controller
determines whether to enter a standard mode or a prioritized mode of collecting images;
upon determining to enter a standard mode, collects the next image at a standard frequency; and
upon determining to enter a prioritized mode, collects a sequence of next images at a prioritized frequency.

9. The system of claim 8 wherein the determining of whether to enter a standard mode or a prioritized mode is based on a difference between actual location and expected location.

10. The system of claim 1 wherein the onboard controller suspends collection of images when the target object enters a coverage gap.

11. The system of claim 10 wherein the onboard controller resumes collection of images when the target object emerges from the coverage gap.

12. The system of claim 1 wherein the analyzing of the collected image includes comparing the collected image to a previously collected image collected with the imaging device oriented towards the expected location for differentiating the target object from celestial objects.

13. A system for tracking a target object that is in earth orbit via a network of satellites having imaging devices for collecting images, the system comprising:
an ephemeris store for storing ephemeris information for the target object;
a component for identifying a next observation time and a next expected location of the target object at that next observation time based on the ephemeris information;
a component for orienting an imaging device of a satellite towards the next expected location;
a component for collecting an image at the next observation time at the next expected location;
a component for analyzing the collected image to determine an actual location of the target object; and
a component for updating the ephemeris information of the ephemeris store with the determined actual location so that the next expected location of the target object is identified based on the determined actual location.

14. The system of claim 13 wherein the ephemeris store and components are part of an onboard controller for the satellites.

15. The system of claim 14 including a component for receiving ephemeris information from a ground controller and a component for transmitting the determined actual location to the ground controller.

16. The system of claim 13 wherein the satellites are nano-satellites that are in middle earth orbit.

17. The system of claim 13 wherein the component for analyzing determines whether to enter a standard mode or a prioritized mode of collecting images, collects the next image at a standard frequency upon determining to enter a standard mode, and collects a sequence of next images at a prioritized frequency upon determining to enter a prioritized mode.

18. The system of claim 13 wherein the component for analyzing, upon determining that the target object is not within the collected image, enters a search mode that reorients the image device toward locations different from the next expected location, collects images at the different locations, and analyzes the collected images to determine the actual location of the target object.

19. A system for tracking target objects that are in earth orbit via a network of satellites having imaging devices for collecting images, the system comprising:
a ground controller for receiving ephemeris information for target objects and directing at least some of the ephemeris information to be transmitted to the satellites; and
a plurality of satellites having onboard controllers for receiving ephemeris information for a target object, collecting images based on expected locations of the target object, identifying actual locations of the target object from the collected images, and identifying a next expected location based on the identified actual locations of the target object.

20. The system of claim 19 wherein the satellites are nano-satellites in middle earth orbit and wherein the onboard controllers collect images at a standard frequency when a tracking criterion is satisfied and at a prioritized frequency when the tracking criterion is not satisfied.

* * * * *